US012691653B2

(12) United States Patent
Bonin et al.

(10) Patent No.: US 12,691,653 B2
(45) Date of Patent: Jul. 28, 2026

(54) METHOD FOR PRODUCING A SOLE OF A SHOE, IN PARTICULAR OF A SPORTS SHOE

(71) Applicant: PUMA SE, Herzogenaurach (DE)

(72) Inventors: Mauro Bonin, Nuremberg (DE); Matthias Hartmann, Forchheim (DE); Reinhold Sussmann, Scheinfeld (DE)

(73) Assignee: PUMA SE, Herzogenaurach (DE)

( * ) Notice: Subject to any disclaimer, the term of this patent is extended or adjusted under 35 U.S.C. 154(b) by 0 days.

(21) Appl. No.: 18/587,255

(22) Filed: Feb. 26, 2024

(65) Prior Publication Data

US 2024/0198616 A1     Jun. 20, 2024

Related U.S. Application Data

(63) Continuation of application No. 17/053,513, filed as application No. PCT/EP2018/061935 on May 8, 2018, now Pat. No. 11,926,115.

(51) Int. Cl.
*A43B 13/18*          (2006.01)
*A43B 13/12*          (2006.01)
(Continued)

(52) U.S. Cl.
CPC ............ *B29D 35/142* (2013.01); *A43B 13/18* (2013.01); *B29C 45/14467* (2013.01); (Continued)

(58) Field of Classification Search
None
See application file for complete search history.

(56) References Cited

U.S. PATENT DOCUMENTS

| | | | |
|---|---|---|---|
| 2,983,056 A * | 5/1961 | Murawski ............ | A43B 13/206 36/32 R |
| 3,469,576 A | 9/1969 | Smith | |

(Continued)

FOREIGN PATENT DOCUMENTS

| | | |
|---|---|---|
| CN | 1285779 A | 2/2001 |
| CN | 1334054 A | 2/2002 |

(Continued)

OTHER PUBLICATIONS

US D748,382 S, 02/2016, Galway et al. (withdrawn)

(Continued)

*Primary Examiner* — Jila M Mohandesi
(74) *Attorney, Agent, or Firm* — Quarles & Brady LLP

(57)          ABSTRACT

A sole structure includes a forefoot region, a midfoot region, and a heel region along a longitudinal direction of the article of footwear. The sole structure includes a midsole, which has a plurality of cavities defined by outer edges, and each of the cavities of the plurality of cavities extends between a lateral side of the footwear and a medial side of the footwear. Each cavity of the plurality of cavities is defined by a first rounded end, a second rounded end opposite of the first rounded end, a front side edge, and a rear side edge. The front side edge and the rear side edge connect the first rounded end with the second rounded end and the plurality of cavities is configured to programmably collapse or deform the sole structure when a force is applied downward.

18 Claims, 8 Drawing Sheets

Figure 1:
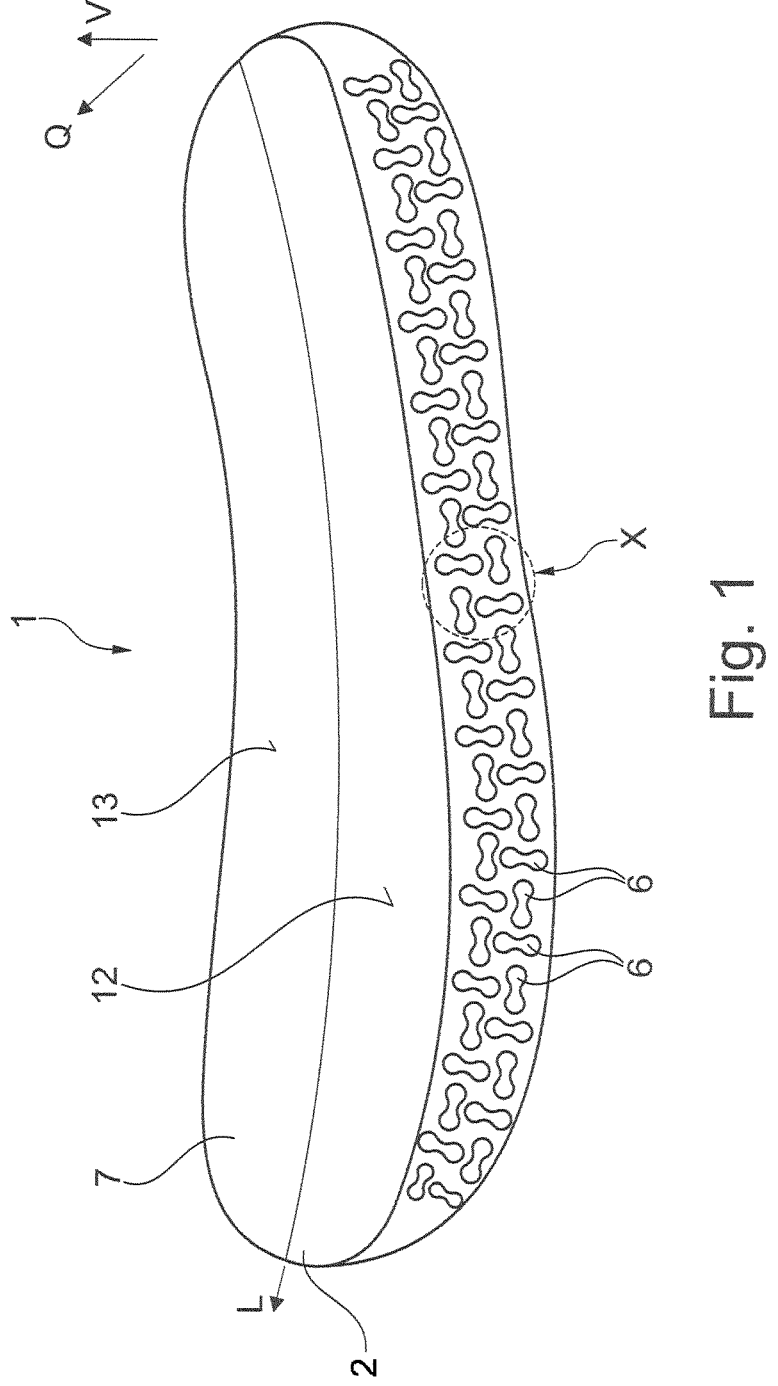

(51) Int. Cl.

| | | |
|---|---|---|
| *B29C 45/14* | (2006.01) | |
| *B29C 70/84* | (2006.01) | |
| *B29D 35/00* | (2010.01) | |
| *B29D 35/12* | (2010.01) | |
| *B29D 35/14* | (2010.01) | |

(52) U.S. Cl.

CPC .......... *B29C 70/84* (2013.01); *B29D 35/0018* (2013.01); *B29D 35/122* (2013.01); *B29D 35/128* (2013.01)

(56) References Cited

U.S. PATENT DOCUMENTS

| | | | |
|---|---|---|---|
| 3,573,155 | A | 3/1971 | Mitchell |
| 3,629,051 | A | 12/1971 | Mitchell |
| 3,785,646 | A * | 1/1974 | Ruskin .............. A63B 21/4015 |
| | | | 482/79 |
| 4,100,686 | A | 7/1978 | Sgarlato et al. |
| 4,112,599 | A | 9/1978 | Krippelz |
| D256,067 | S | 7/1980 | Hagg et al. |
| 4,235,026 | A | 11/1980 | Plagenhoef |
| 4,236,326 | A * | 12/1980 | Inohara .................. A43B 13/20 |
| | | | 36/35 B |
| D265,017 | S | 6/1982 | Vermonet |
| D272,963 | S | 3/1984 | Muller et al. |
| 4,779,359 | A | 10/1988 | Famolare, Jr. |
| D298,582 | S | 11/1988 | Caire |
| D304,520 | S | 11/1989 | Clark |
| D307,971 | S | 5/1990 | Maccano et al. |
| 4,942,679 | A | 7/1990 | Brandon et al. |
| 4,944,099 | A | 7/1990 | Davis |
| D311,989 | S | 11/1990 | Parker et al. |
| 5,042,176 | A | 8/1991 | Rudy |
| 5,084,987 | A | 2/1992 | Flemming |
| D324,762 | S | 3/1992 | Hatfield |
| 5,134,790 | A | 8/1992 | Woitschaetzke et al. |
| D329,528 | S | 9/1992 | Hatfield |
| 5,152,081 | A | 10/1992 | Hallenbeck et al. |
| D330,629 | S | 11/1992 | Bramani |
| 5,197,206 | A | 3/1993 | Shorten |
| 5,197,207 | A | 3/1993 | Shorten |
| D337,650 | S | 7/1993 | Thomas, III et al. |
| D340,797 | S | 11/1993 | Pallera et al. |
| 5,313,717 | A | 5/1994 | Allen et al. |
| 5,329,705 | A | 7/1994 | Grim et al. |
| D350,222 | S | 9/1994 | Hase |
| 5,378,223 | A | 1/1995 | Grim et al. |
| 5,383,290 | A | 1/1995 | Grim |
| D356,438 | S | 3/1995 | Opie et al. |
| D365,920 | S | 1/1996 | Schneider |
| 5,607,749 | A | 3/1997 | Strumor |
| D386,589 | S | 11/1997 | Cass |
| D389,991 | S | 2/1998 | Elliott |
| D390,349 | S | 2/1998 | Murai et al. |
| 5,952,065 | A | 9/1999 | Mitchell et al. |
| D414,920 | S | 10/1999 | Cahill |
| D415,610 | S | 10/1999 | Cahill |
| D415,876 | S | 11/1999 | Cahill |
| 5,979,078 | A | 11/1999 | McLaughlin |
| D423,199 | S | 4/2000 | Cahill |
| D429,874 | S | 8/2000 | Gumbert |
| D431,346 | S | 10/2000 | Birkenstock |
| D444,620 | S | 7/2001 | Della Valle |
| D446,002 | S | 8/2001 | Leong et al. |
| D460,852 | S | 7/2002 | Daudier |
| 6,467,197 | B1 | 10/2002 | Mitsui et al. |
| 6,502,331 | B2 * | 1/2003 | Hines .................. A43B 19/005 |
| | | | 36/43 |
| 6,558,784 | B1 | 5/2003 | Norton et al. |
| 6,618,959 | B1 | 9/2003 | Sussmann |
| 6,647,646 | B2 | 11/2003 | Mitsui et al. |
| D483,932 | S | 12/2003 | Cooper |
| 6,670,029 | B2 | 12/2003 | Norton et al. |
| 6,763,611 | B1 | 7/2004 | Fusco |
| 6,763,615 | B2 | 7/2004 | Mitsui et al. |
| D494,343 | S | 8/2004 | Morris |
| 6,782,640 | B2 | 8/2004 | Westin |
| D496,149 | S | 9/2004 | Belley et al. |
| 6,817,113 | B2 | 11/2004 | Pan |
| 6,843,000 | B1 | 1/2005 | Park |
| 6,848,200 | B1 | 2/2005 | Westin |
| 6,883,252 | B2 | 4/2005 | Cagner |
| 6,920,707 | B1 | 7/2005 | Greene et al. |
| 6,951,066 | B2 | 10/2005 | Snow |
| 6,957,504 | B2 | 10/2005 | Morris |
| D512,208 | S | 12/2005 | Kubo et al. |
| D515,297 | S | 2/2006 | Acheson |
| 7,086,179 | B2 | 8/2006 | Dojan et al. |
| 7,086,180 | B2 | 8/2006 | Dojan et al. |
| 7,096,605 | B1 | 8/2006 | Kozo et al. |
| 7,100,310 | B2 | 9/2006 | Foxen et al. |
| 7,141,131 | B2 | 11/2006 | Foxen et al. |
| 7,153,560 | B2 | 12/2006 | Hofmann |
| 7,254,906 | B2 | 8/2007 | Morris et al. |
| D549,934 | S | 9/2007 | Horne et al. |
| D551,831 | S | 10/2007 | Romero-Sanchez |
| D556,982 | S | 12/2007 | Harper et al. |
| D560,883 | S | 2/2008 | McClaskie |
| D561,433 | S | 2/2008 | McClaskie |
| D571,085 | S | 6/2008 | McClaskie |
| 7,401,420 | B2 | 7/2008 | Dojan et al. |
| D576,780 | S | 9/2008 | Jolicoeur |
| D586,090 | S | 2/2009 | Turner et al. |
| 7,484,318 | B2 | 2/2009 | Finkelstein |
| D596,384 | S | 7/2009 | Andersen et al. |
| 7,555,848 | B2 | 7/2009 | Aveni et al. |
| 7,556,846 | B2 | 7/2009 | Dojan et al. |
| 7,559,107 | B2 | 7/2009 | Dojan et al. |
| 7,562,469 | B2 | 7/2009 | Dojan |
| D597,293 | S | 8/2009 | Banik et al. |
| D601,333 | S | 10/2009 | McClaskie |
| 7,665,230 | B2 | 2/2010 | Dojan et al. |
| 7,676,955 | B2 | 3/2010 | Dojan et al. |
| 7,676,956 | B2 | 3/2010 | Dojan et al. |
| 7,685,741 | B2 | 3/2010 | Friedman |
| D616,183 | S | 5/2010 | Skaja |
| D617,540 | S | 6/2010 | McClaskie |
| D624,291 | S | 9/2010 | Henderson |
| 7,805,859 | B2 | 10/2010 | Finkelstein |
| D631,237 | S | 1/2011 | Genuin et al. |
| D631,646 | S | 2/2011 | Muller |
| D633,286 | S | 3/2011 | Skaja |
| D633,287 | S | 3/2011 | Skaja |
| D636,571 | S | 4/2011 | Avar |
| D640,064 | S * | 6/2011 | Horn ..................... A61F 13/627 |
| | | | D5/59 |
| D640,451 | S * | 6/2011 | Chang ............................ D2/917 |
| 8,074,377 | B2 | 12/2011 | Nishiwaki et al. |
| 8,112,909 | B2 | 2/2012 | Kubo et al. |
| 8,122,614 | B2 | 2/2012 | Sussmann |
| 8,176,657 | B2 | 5/2012 | Schinlder et al. |
| 8,296,969 | B2 | 10/2012 | Granger et al. |
| D671,305 | S | 11/2012 | Escobar |
| D671,306 | S | 11/2012 | Tzenos |
| 8,312,644 | B2 | 11/2012 | Peikert et al. |
| 8,321,984 | B2 | 12/2012 | Dojan et al. |
| 8,356,429 | B2 | 1/2013 | Eder et al. |
| 8,418,379 | B2 | 4/2013 | Nishiwaki et al. |
| 8,429,835 | B2 | 4/2013 | Dojan et al. |
| D693,553 | S | 11/2013 | McClaskie |
| 8,572,866 | B2 | 11/2013 | Dojan et al. |
| 8,578,535 | B2 | 11/2013 | Dojan et al. |
| D696,501 | S | 12/2013 | Miner |
| D696,502 | S | 12/2013 | Miner |
| D696,503 | S | 12/2013 | Miner |
| 8,657,979 | B2 | 2/2014 | Dojan et al. |
| 8,671,591 | B2 | 3/2014 | Brown |
| 8,745,892 | B2 | 6/2014 | Polegato Moretti |
| D709,680 | S | 7/2014 | Herath |
| 8,789,298 | B2 | 7/2014 | Eder et al. |
| D711,081 | S | 8/2014 | Miner |
| D713,623 | S | 9/2014 | Lo |
| 8,961,844 | B2 | 2/2015 | Baghdadi et al. |
| D731,763 | S | 6/2015 | Solstad |

(56)  References Cited

U.S. PATENT DOCUMENTS

| | | |
|---|---|---|
| D734,600 S | 7/2015 | Gargiulo |
| 9,078,493 B2 | 7/2015 | Bradford |
| D739,131 S | 9/2015 | Del Biondi |
| 9,125,454 B2 | 9/2015 | De Roode et al. |
| D740,003 S | 10/2015 | Herath |
| D740,004 S | 10/2015 | Hoellmueller et al. |
| D746,559 S | 1/2016 | Besanceney et al. |
| 9,241,536 B2 | 1/2016 | Smaldone et al. |
| D753,381 S | 4/2016 | Ostapenko |
| D756,085 S | 5/2016 | Spring |
| D756,620 S | 5/2016 | Boys |
| 9,351,534 B2 | 5/2016 | Peikert et al. |
| D758,056 S | 6/2016 | Galway et al. |
| D759,358 S | 6/2016 | Cullen |
| 9,402,439 B2 | 8/2016 | Cross et al. |
| D765,361 S | 9/2016 | Johnsongriffin |
| D765,362 S | 9/2016 | Kuerbis |
| D767,263 S | 9/2016 | Reiser |
| 9,456,656 B2 | 10/2016 | Cross |
| 9,486,036 B1 | 11/2016 | Douglas |
| D773,161 S | 12/2016 | Teteriatnikov |
| D773,790 S | 12/2016 | Raysse |
| D773,791 S | 12/2016 | Raysse |
| 9,510,640 B2 | 12/2016 | Bier et al. |
| D776,410 S | 1/2017 | Galway et al. |
| 9,538,811 B2 | 1/2017 | Cross |
| 9,549,590 B2 | 1/2017 | Cross et al. |
| 9,554,620 B2 | 1/2017 | Cross et al. |
| 9,554,622 B2 | 1/2017 | Cross |
| 9,554,624 B2 | 1/2017 | Cross |
| 9,572,404 B2 | 2/2017 | Dojan et al. |
| D781,543 S | 3/2017 | Raysse |
| 9,585,435 B2 | 3/2017 | Bier et al. |
| D783,247 S | 4/2017 | McMillan |
| 9,610,746 B2 | 4/2017 | Wardlaw et al. |
| 9,682,522 B2 | 6/2017 | Baghdadi et al. |
| 9,687,041 B2 | 6/2017 | Peikert et al. |
| D790,817 S | 7/2017 | Perkins et al. |
| D791,452 S | 7/2017 | Dombrow |
| D792,067 S | 7/2017 | Raysse |
| D793,680 S | 8/2017 | Lee |
| D793,688 S | 8/2017 | Avar et al. |
| D794,289 S | 8/2017 | Kanata |
| 9,717,301 B2 | 8/2017 | Peikert et al. |
| 9,723,895 B2 | 8/2017 | Schaefer et al. |
| D797,418 S | 9/2017 | Lee et al. |
| D798,553 S | 10/2017 | Lee |
| D799,183 S | 10/2017 | Weeks |
| 9,775,769 B2 | 10/2017 | Brown et al. |
| 9,781,970 B2 | 10/2017 | Wardlaw et al. |
| 9,781,974 B2 | 10/2017 | Reinhardt et al. |
| 9,788,598 B2 | 10/2017 | Reinhardt et al. |
| 9,788,606 B2 | 10/2017 | Reinhardt et al. |
| 9,795,186 B2 | 10/2017 | Reinhardt et al. |
| 9,820,528 B2 | 11/2017 | Reinhardt et al. |
| 9,820,532 B2 | 11/2017 | Cross et al. |
| 9,849,645 B2 | 12/2017 | Wardlaw et al. |
| D808,143 S | 1/2018 | Negri |
| 9,854,869 B2 | 1/2018 | Nordstrom |
| 9,861,159 B2 | 1/2018 | Kohatsu et al. |
| D809,755 S | 2/2018 | Stavseng et al. |
| D809,756 S | 2/2018 | Stavseng et al. |
| D809,761 S | 2/2018 | Parrett |
| D810,407 S | 2/2018 | DeAlmeida |
| D811,062 S | 2/2018 | Teague |
| 9,884,947 B2 | 2/2018 | Prissok et al. |
| D813,508 S | 3/2018 | Weeks |
| 9,926,423 B2 | 3/2018 | Baghdadi |
| D814,752 S | 4/2018 | Ormsby |
| 9,930,928 B2 | 4/2018 | Whiteman et al. |
| 9,961,961 B2 | 5/2018 | Smith |
| 9,968,157 B2 | 5/2018 | Wardlaw et al. |
| 9,968,160 B2 | 5/2018 | Peyton |
| 10,039,342 B2 | 8/2018 | Reinhardt et al. |
| 10,051,914 B2 | 8/2018 | Cross et al. |
| 10,051,917 B2 | 8/2018 | Dojan et al. |
| D828,686 S | 9/2018 | Hoellmueller et al. |
| D831,315 S | 10/2018 | Mahoney |
| D831,317 S | 10/2018 | Jenkins et al. |
| 10,098,411 B2 | 10/2018 | Hoffer et al. |
| 10,098,412 B2 | 10/2018 | Hoffer et al. |
| 10,111,494 B2 | 10/2018 | Cross |
| D836,893 S | 1/2019 | Bischoff et al. |
| 10,182,612 B2 | 1/2019 | Bunnell et al. |
| D840,135 S | 2/2019 | Dombrow |
| D840,136 S | 2/2019 | Herath et al. |
| D840,137 S | 2/2019 | Herath et al. |
| 10,226,099 B2 | 3/2019 | Bischoff |
| 10,227,467 B2 | 3/2019 | Baghdadi |
| D846,255 S | 4/2019 | Khalife |
| D846,256 S | 4/2019 | Khalife |
| 10,259,183 B2 | 4/2019 | Wardlaw et al. |
| 10,271,615 B2 | 4/2019 | Cross |
| D847,475 S | 5/2019 | Khalife |
| D847,480 S | 5/2019 | Khalife |
| 10,278,448 B2 | 5/2019 | Cross |
| 10,285,471 B2 | 5/2019 | Cross |
| D850,766 S | 6/2019 | Girard et al. |
| D851,889 S | 6/2019 | Dobson et al. |
| D852,475 S | 7/2019 | Hoellmueller |
| D852,476 S | 7/2019 | Hartmann |
| D853,691 S | 7/2019 | Coonrod et al. |
| D853,699 S | 7/2019 | Coonrod et al. |
| 10,433,616 B2 | 10/2019 | Takeshita et al. |
| 10,470,521 B2 | 11/2019 | Iuchi et al. |
| 10,645,998 B2 | 5/2020 | Shaffer et al. |
| 10,786,039 B2 | 9/2020 | Kohatsu et al. |
| 11,076,656 B2 | 8/2021 | Kormann et al. |
| 11,744,322 B2* | 9/2023 | Hartmann ............ A43B 13/125 |
| | | 36/28 |
| 2002/0071946 A1 | 6/2002 | Norton et al. |
| 2003/0097767 A1 | 5/2003 | Perkinson |
| 2003/0208925 A1 | 11/2003 | Pan |
| 2004/0148805 A1 | 8/2004 | Morris |
| 2004/0154189 A1 | 8/2004 | Wang |
| 2006/0026863 A1 | 2/2006 | Liu |
| 2006/0234012 A1 | 10/2006 | Wang |
| 2007/0022628 A1* | 2/2007 | Juan ................... A43B 13/125 |
| | | 36/28 |
| 2008/0127513 A1* | 6/2008 | Schinlder ............. A43B 13/206 |
| | | 36/25 R |
| 2008/0148599 A1 | 6/2008 | Collins |
| 2009/0064542 A1* | 3/2009 | Figueroa ............. A43B 13/187 |
| | | 36/7.4 |
| 2009/0172971 A1 | 7/2009 | Peikert et al. |
| 2010/0242309 A1 | 9/2010 | McCann |
| 2011/0047720 A1 | 3/2011 | Maranan et al. |
| 2011/0197468 A1 | 8/2011 | Kubo et al. |
| 2011/0252670 A1 | 10/2011 | Smith |
| 2013/0055599 A1 | 3/2013 | Peikert et al. |
| 2013/0059116 A1 | 3/2013 | Peikert et al. |
| 2013/0145653 A1 | 6/2013 | Bradford |
| 2013/0160223 A1 | 6/2013 | Bier et al. |
| 2013/0233477 A1 | 9/2013 | Bier et al. |
| 2013/0291409 A1 | 11/2013 | Reinhardt et al. |
| 2013/0312284 A1 | 11/2013 | Berend et al. |
| 2014/0033574 A1* | 2/2014 | Wan ................... A43B 1/0072 |
| | | 36/103 |
| 2014/0086504 A1 | 3/2014 | Arai |
| 2014/0151918 A1 | 6/2014 | Hartmann |
| 2014/0196308 A1 | 7/2014 | Baratta et al. |
| 2014/0208610 A1 | 7/2014 | Dirsa et al. |
| 2014/0223776 A1 | 8/2014 | Wardlaw et al. |
| 2014/0223777 A1 | 8/2014 | Whiteman et al. |
| 2014/0259745 A1 | 9/2014 | Vaglio |
| 2015/0096203 A1 | 4/2015 | Brown et al. |
| 2015/0272272 A1 | 10/2015 | Scofield |
| 2016/0007676 A1 | 1/2016 | Leimer et al. |
| 2016/0025343 A1 | 1/2016 | Bertoldi |
| 2016/0037859 A1 | 2/2016 | Smith et al. |
| 2016/0044992 A1 | 2/2016 | Reinhardt et al. |
| 2016/0120260 A1 | 5/2016 | Hansen et al. |
| 2016/0227876 A1 | 8/2016 | Le et al. |
| 2016/0242502 A1 | 8/2016 | Spanks |

(56)　　　　References Cited

U.S. PATENT DOCUMENTS

| | | |
|---|---|---|
| 2016/0278481 A1 | 9/2016 | Le et al. |
| 2016/0295955 A1 | 10/2016 | Wardlaw et al. |
| 2016/0324260 A1 | 11/2016 | Guyan |
| 2016/0345665 A1 | 12/2016 | Kohatsu et al. |
| 2016/0374428 A1 | 12/2016 | Kormann et al. |
| 2017/0006958 A1 | 1/2017 | Jeong |
| 2017/0105478 A1 | 4/2017 | Cross et al. |
| 2017/0172251 A1 | 6/2017 | Douglas |
| 2017/0245581 A1 | 8/2017 | Mcfarland et al. |
| 2017/0245582 A1 | 8/2017 | Green et al. |
| 2017/0253710 A1 | 9/2017 | Smith et al. |
| 2017/0258178 A1 | 9/2017 | Cross et al. |
| 2017/0258180 A1 | 9/2017 | Cross et al. |
| 2017/0259474 A1 | 9/2017 | Holmes et al. |
| 2017/0341325 A1 | 11/2017 | Le et al. |
| 2017/0354568 A1 | 12/2017 | Brown et al. |
| 2018/0000197 A1 | 1/2018 | Wardlaw et al. |
| 2018/0027922 A1 | 2/2018 | Orand |
| 2018/0035755 A1 | 2/2018 | Reinhardt et al. |
| 2018/0049509 A1 | 2/2018 | Zwick et al. |
| 2018/0064210 A1 | 3/2018 | Turner et al. |
| 2018/0077997 A1 | 3/2018 | Hoffer et al. |
| 2018/0077998 A1 | 3/2018 | Nordstrom |
| 2018/0092432 A1 | 4/2018 | Hoffer et al. |
| 2018/0098602 A1 | 4/2018 | Kohatsu et al. |
| 2018/0100049 A1 | 4/2018 | Prissok et al. |
| 2018/0103719 A1 | 4/2018 | Chen |
| 2018/0103725 A1 | 4/2018 | Chen |
| 2018/0110292 A1 | 4/2018 | Beers et al. |
| 2018/0116327 A9 | 5/2018 | McFarland et al. |
| 2018/0125156 A1 | 5/2018 | Bray, Jr. |
| 2018/0125157 A1 | 5/2018 | Bray, Jr. |
| 2018/0132487 A1 | 5/2018 | Kormann et al. |
| 2018/0153264 A1 | 6/2018 | Amos et al. |
| 2018/0154598 A1 | 6/2018 | Kurtz et al. |
| 2018/0199667 A1 | 7/2018 | Wang |
| 2018/0206591 A1 | 7/2018 | Whiteman et al. |
| 2018/0206599 A1 | 7/2018 | Amos et al. |
| 2018/0235310 A1 | 8/2018 | Wardlaw et al. |
| 2018/0289108 A1 | 10/2018 | Hoffer et al. |
| 2018/0289109 A1 | 10/2018 | Beers et al. |
| 2018/0303198 A1 | 10/2018 | Reinhardt et al. |
| 2018/0325217 A1 | 11/2018 | Dojan et al. |
| 2018/0338569 A1 | 11/2018 | Cross et al. |
| 2018/0352900 A1 | 12/2018 | Hartmann et al. |
| 2019/0082782 A1 | 3/2019 | Bunnell et al. |
| 2019/0126580 A1 | 5/2019 | Paulson et al. |
| 2019/0133251 A1 | 5/2019 | Hartmann et al. |
| 2019/0150564 A1 | 5/2019 | Bischoff |
| 2019/0216167 A1 | 7/2019 | Hoffer et al. |
| 2019/0216168 A1 | 7/2019 | Hoffer et al. |
| 2019/0223539 A1 | 7/2019 | Hoffer et al. |
| 2019/0223550 A1 | 7/2019 | Levy |
| 2019/0223551 A1 | 7/2019 | Hoffer et al. |
| 2019/0281921 A1 | 9/2019 | Bray, Jr. |
| 2019/0291371 A1 | 9/2019 | Wardlaw et al. |

FOREIGN PATENT DOCUMENTS

| | | | | |
|---|---|---|---|---|
| CN | 1653982 A | 8/2005 | | |
| CN | 2790218 Y | 6/2006 | | |
| CN | 101299941 A | 11/2008 | | |
| CN | 201178714 Y * | 1/2009 | | |
| CN | 201226862 Y | 4/2009 | | |
| CN | 101537675 A | 9/2009 | | |
| CN | 201813947 U | 5/2011 | | |
| CN | 102273769 A | 12/2011 | | |
| CN | 102481746 A | 5/2012 | | |
| CN | 104256997 A | 1/2015 | | |
| CN | 105025745 A | 11/2015 | | |
| CN | 105476176 A | 4/2016 | | |
| CN | 105595519 A | 5/2016 | | |
| CN | 106939097 A | 7/2017 | | |
| CN | 107048591 A | 8/2017 | | |
| CN | 206808782 U | 12/2017 | | |
| DE | 3440206 A1 | 5/1985 | | |
| DE | 3440206 C2 * | 5/1998 | ............ | A43B 13/18 |
| DE | 202005017043 U1 * | 4/2007 | .......... | A43B 1/0009 |
| DE | 102015118251 A1 | 4/2017 | | |
| DM | 102274 | 8/2018 | | |
| DM | 103418 | 9/2018 | | |
| EM | 001286116-0005 | 7/2011 | | |
| EM | 002219956-0024 | 5/2013 | | |
| EM | 002772764-0015 | 2/2016 | | |
| EM | 003165984-0005 | 6/2016 | | |
| EM | 003039619-0034 | 7/2016 | | |
| EM | 003315555-0001 | 8/2016 | | |
| EM | 003316389-0001 | 8/2016 | | |
| EM | 003330174-0003 | 8/2016 | | |
| EM | 003344076-0002 | 9/2016 | | |
| EM | 003362672-0001 | 9/2016 | | |
| EM | 003718311-0019 | 2/2017 | | |
| EM | 003761089-0028 | 5/2017 | | |
| EM | 004363935-0008 | 10/2017 | | |
| EM | 004386571-0002 | 10/2017 | | |
| EM | 004366326-0001 | 11/2017 | | |
| EM | 003761113-0025 | 12/2017 | | |
| EM | 004675411-0006 | 1/2018 | | |
| EM | 004543882-0008 | 5/2018 | | |
| EM | 005243227-0002 | 5/2018 | | |
| EM | 005260023-0003 | 5/2018 | | |
| EM | 005278413-0002 | 5/2018 | | |
| EM | 005320371-0002 | 7/2018 | | |
| EM | 005841939-0004 | 12/2018 | | |
| EM | 003649060-0005 | 1/2019 | | |
| EM | 004352755-0004 | 1/2019 | | |
| EM | 005612025-0001 | 1/2019 | | |
| EM | 004812501-0004 | 2/2019 | | |
| EM | 005191004-0010 | 2/2019 | | |
| EM | 006335345-0003 | 4/2019 | | |
| EM | 003522580-0029 | 6/2019 | | |
| EM | 003649540-0001 | 7/2019 | | |
| EP | 875163 A2 * | 11/1998 | .......... | A43B 13/203 |
| EP | 1021965 A2 | 7/2000 | | |
| EP | 1164884 A1 | 1/2002 | | |
| EP | 1033924 B1 | 9/2003 | | |
| EP | 1563750 A1 | 8/2005 | | |
| EP | 1991078 A1 | 11/2008 | | |
| EP | 2103420 A2 | 9/2009 | | |
| EP | 1979401 B1 | 9/2010 | | |
| EP | 2490561 A1 | 8/2012 | | |
| EP | 1991728 B1 | 1/2013 | | |
| EP | 2611323 A1 | 7/2013 | | |
| EP | 2490564 B1 | 1/2014 | | |
| EP | 2786670 A1 | 10/2014 | | |
| EP | 2724635 B1 | 3/2015 | | |
| EP | 1796493 B1 | 4/2015 | | |
| EP | 2676562 B1 | 4/2015 | | |
| EP | 2611321 B1 | 8/2015 | | |
| EP | 2984956 A1 | 2/2016 | | |
| EP | 3001922 A1 | 4/2016 | | |
| EP | 3001923 A1 | 4/2016 | | |
| EP | 3027377 A1 | 6/2016 | | |
| EP | 3041892 A1 | 7/2016 | | |
| EP | 2197311 B1 | 8/2016 | | |
| EP | 2649896 B1 | 10/2016 | | |
| EP | 3078287 A1 | 10/2016 | | |
| EP | 3114954 A1 | 1/2017 | | |
| EP | 3114955 A1 | 1/2017 | | |
| EP | 3114956 A1 | 1/2017 | | |
| EP | 3114959 A1 | 1/2017 | | |
| EP | 2713794 B1 | 4/2017 | | |
| EP | 3186306 A1 | 7/2017 | | |
| EP | 3200640 A1 | 8/2017 | | |
| EP | 2467037 B1 | 10/2017 | | |
| EP | 2872309 B1 | 11/2017 | | |
| EP | 3267818 A1 | 1/2018 | | |
| EP | 3267820 A1 | 1/2018 | | |
| EP | 3267822 A1 | 1/2018 | | |
| EP | 3267823 A1 | 1/2018 | | |
| EP | 3267824 A2 | 1/2018 | | |
| EP | 3267826 A1 | 1/2018 | | |
| EP | 2910141 B1 | 2/2018 | | |
| EP | 3289907 A1 | 3/2018 | | |

(56)          References Cited

FOREIGN PATENT DOCUMENTS

| | | | |
|---|---|---|---|
| EP | 3302143 | A1 | 4/2018 |
| EP | 3308663 | A1 | 4/2018 |
| EP | 3318150 | A1 | 5/2018 |
| EP | 3338581 | A1 | 6/2018 |
| EP | 3346862 | A1 | 7/2018 |
| EP | 2845504 | B1 | 8/2018 |
| EP | 3352607 | A1 | 8/2018 |
| EP | 3352608 | A1 | 8/2018 |
| EP | 3352610 | A1 | 8/2018 |
| EP | 3352611 | A1 | 8/2018 |
| EP | 3352612 | A1 | 8/2018 |
| EP | 3352615 | A1 | 8/2018 |
| EP | 3338984 | A3 | 9/2018 |
| EP | 2948012 | B1 | 10/2018 |
| EP | 3381311 | A1 | 10/2018 |
| EP | 3391767 | A1 | 10/2018 |
| EP | 3412164 | A1 | 12/2018 |
| EP | 3416516 | A1 | 12/2018 |
| EP | 2611322 | B1 | 1/2019 |
| EP | 3423621 | A1 | 1/2019 |
| EP | 3434128 | A1 | 1/2019 |
| EP | 3010362 | B1 | 4/2019 |
| EP | 3466291 | A1 | 4/2019 |
| EP | 3248770 | B1 | 5/2019 |
| EP | 3348160 | B1 | 5/2019 |
| EP | 3476237 | A1 | 5/2019 |
| EP | 3484320 | A1 | 5/2019 |
| EP | 3284362 | B1 | 7/2019 |
| EP | 3386334 | B1 | 7/2019 |
| EP | 3534743 | A1 | 9/2019 |
| GB | 350493 | A | 6/1931 |
| JP | H11285402 | A * | 10/1999 |
| JP | 2002526126 | A | 8/2002 |
| JP | 2010158511 | A | 7/2010 |
| JP | 5465814 | B1 | 4/2014 |
| JP | 2016202903 | A | 12/2016 |
| KR | 101567716 | B1 | 11/2015 |
| WO | 2006112622 | A1 | 10/2006 |
| WO | 2010021517 | A2 | 2/2010 |
| WO | 20100084367 | A1 | 7/2010 |
| WO | 2015017088 | A1 | 2/2015 |
| WO | 2000051458 | A1 | 11/2015 |
| WO | 2016030026 | A1 | 3/2016 |
| WO | 2016030333 | A1 | 3/2016 |
| WO | 2016053443 | A1 | 4/2016 |
| WO | 2016144406 | A1 | 9/2016 |
| WO | 2016144407 | A1 | 9/2016 |
| WO | 2016144408 | A1 | 9/2016 |
| WO | 2016144409 | A1 | 9/2016 |
| WO | 2016144410 | A1 | 9/2016 |
| WO | 2016144413 | A1 | 9/2016 |
| WO | 2016191109 | A1 | 12/2016 |
| WO | 2017042127 | A1 | 3/2017 |
| WO | 2017053650 | A1 | 3/2017 |
| WO | 2017053654 | A1 | 3/2017 |
| WO | 2017053658 | A1 | 3/2017 |
| WO | 2017053665 | A1 | 3/2017 |
| WO | 2017053669 | A1 | 3/2017 |
| WO | 2017053674 | A1 | 3/2017 |
| WO | 2017097315 | A1 | 6/2017 |
| WO | 2017142857 | A1 | 8/2017 |
| WO | 2017151496 | A1 | 9/2017 |
| WO | 2018011030 | A1 | 1/2018 |
| WO | 2018083676 | A1 | 5/2018 |
| WO | 2018099833 | A1 | 6/2018 |
| WO | 2018103811 | A1 | 6/2018 |
| WO | 2018169535 | A1 | 9/2018 |
| WO | 2018169537 | A1 | 9/2018 |
| WO | 2018192262 | A1 | 10/2018 |
| WO | 2019029781 | A1 | 2/2019 |
| WO | 2019073607 | A1 | 4/2019 |
| WO | 2019101339 | A1 | 5/2019 |
| WO | 2019150492 | A1 | 8/2019 |

OTHER PUBLICATIONS

Bicycling Catalog 39—Giant Phase 2 Road Shoe [online] <https://www.camdenbikes.com/product/giant-phase-2-road-shoe-243911-1.htm> Accessed Date: Jul. 16, 2019 (3 pages).

Bicycling Catalog 39—Line MES composite sole off-road shoe [online]: <https://www.berkshirebikeandboard.com/product/giant-line-mes-composite-sole-off-road-shoe-341091-1.htm> Accessed Date: Jul. 16, 2019 (4 pages).

Hot pressing film TPU film for bonding synthetic leather and mesh fabric together on shoes upper [online] <https://www.alibaba.com/product-detail/hot-pressing-film-TPU-film-for_60164856956.html> Accessed Date: Jul. 16, 2019 (5 pages).

First Office Action from related Chinese Patent Application No. 201880093277_X dated Nov. 26, 2021 (14 pages) including English translation.

Office Action from related Japanese Patent Application No. 2020-562609 dated Dec. 21, 2021 (11 pages) including English translation.

International Search Report of International Application No. PCT/EP2018/061935, mailed Jan. 18, 2019, 7 pages.

Written Opinion of International Application No. PCT/EP2018/061935, mailed Jan. 18, 2019, 6 pages.

International Preliminary Report on Patentability (Form IPEA/409) of International Application No. PCT/EP2018/061935, mailed Jul. 6, 2020, 20 pages.

International Search Report of International Application No. PCT/EP2018/061934 mailed Jan. 17, 2019, 6 pages.

Written Opinion of International Application No. PCT/EP2018/061934 mailed Jan. 17, 2019, 7 pages (English translation unavailable).

International Preliminary Report on Patentability (Form IPEA/409) of International Application No. PCT/EP2018/061934, mailed Jan. 3, 2020, 24 pages (English translation unavailable).

\* cited by examiner

METHOD FOR PRODUCING A SOLE OF A SHOE, IN PARTICULAR OF A SPORTS SHOE

CROSS REFERENCE TO RELATED APPLICATIONS

The present application is a continuation of U.S. patent application Ser. No. 17/053,513, filed on Nov. 6, 2020, which is a § 371 national stage application based on PCT/EP2018/061935, filed on May 8, 2018, each of which are incorporated by reference herein in their entirety.

REFERENCE REGARDING FEDERALLY SPONSORED RESEARCH OR DEVELOPMENT

Not applicable

SEQUENCE LISTING

Not applicable

BACKGROUND

1. Field of the Disclosure

The invention relates to a method for producing a sole of a shoe, in particular to of a sports shoe.

2. Description of the Background

Especially for sports shoes, soles are sometimes required or desired which have a number of recesses which extend in a transverse direction perpendicular to the longitudinal direction as well as perpendicular to the vertical direction and at least partially penetrate the sole. This is an attempt to give the sole a certain and desired spring behaviour by the geometrical design of the sole. This means that the sole exhibits a desired deformation behaviour in the vertical direction when subjected to the weight of the wearer of the shoe, in particular a certain characteristic curve between the force applied and the strain in the vertical direction. Such a sole is known from U.S. Pat. No. 2,983,056 A, for example. The body of the sole is provided here in transverse direction with a plurality of recesses, which are formed circularly, laterally on the sole, thus seen in transverse direction. Such recesses can be used to influence the spring and damping behaviour of the sole.

The invention is based on the object of providing a method of the type mentioned above by which such soles can be manufactured with dimensional accuracy and process stability, especially with complex recesses.

The solution of this object by the invention is characterized by the fact that the method comprises the following steps:

a) Producing of a first sole part in a first mould or mould part by injecting, spraying or pouring the sole material (in injection-moldable, pourable or sprayable condition) into a mould cavity of the first mould or mould part, wherein a number of volume elements protrude into the mould cavity and create cavities in the first sole part;

b) Producing of a second sole part in a second mould or mould part by injecting, spraying or pouring the sole material (in injection-moldable, pourable or sprayable condition) into a mould cavity of the second mould or mould part, wherein a number of volume elements protrude into the mould cavity and create cavities in the second sole part;

c) After the first and second sole parts have solidified: Removing the first and second sole parts from the first and second mould or mould part and placing the first and second sole parts into a third mould;

d) Overpouring, overspraying and/or overinjecting a joining material over at least one section of the first and second sole parts, wherein the sections of the first and second sole part over which the material is overpoured, oversprayed and/or overinjected adjoining each other, in order to join the first and second sole parts to each other.

Accordingly, at least two parts, preferably two halves, of the sole are prefabricated in the said first or second mould, creating cavities in the sole which, during subsequent use of the shoe, extend in particular in a direction transverse to the longitudinal direction of the shoe and to the vertical direction (when the shoe is used as intended). These two prefabricated parts of the sole are then placed in a third mould and joined together by applying a bonding material.

In general, more than two parts can be used. In this case, it is accordingly provided that the method will further comprise the steps:

e) Producing of at least one further sole part in a further mould or mould part by injecting, spraying or pouring the sole material (in injection-moldable, pourable or sprayable condition) into a mould cavity of the further mould or mould part, wherein a number of volume elements protrude into the mould cavity and create cavities in the further sole part;

f) After the further sole part has solidified: Removing the further sole part from the further mould or mould part and inserting the further sole part together with the first and second sole part into the third mould;

g) Overpouring, overspraying and/or overinjecting a joining material over at least one section of the first, the second and the further sole part, wherein the sections of the first, the second and the further sole part over which the material is overpoured, oversprayed and/or overinjected adjoining each other, in order to join the first, the second and the further sole parts to each other.

In the third mould again volume elements can be arranged, which during the above steps d) or g) fill the cavities in the sole parts and thus keep them free.

During the production of the first and second sole part the mould cavities of the first and second mould or mould part can be closed off by a closure part. This results in a defined geometry for the part of the sole to be produced.

Before the sole parts are inserted into the third mould, a further sole element is preferably placed in the third mould. This further sole element is preferably an outer sole. Thereby, it is preferably provided that the joining material and the further sole element are arranged on opposite sides of the sole to be produced. Between the further sole element and the sole parts a binding agent can be introduced; this is in particular an adhesive with liquid polyurethane being the preferred choice.

Polyurethane material, thermoplastic polyurethane (TPU) or thermoplastic elastomer (TPE) or a material comprising these substances is preferably used as material for the sole parts and/or as joining material. The material for the sole parts and/or the joining material is thereby preferably foamed.

The material of the sole parts has preferably a density between 0.20 and 0.50 g/cm3. It has preferably a hardness between 30 and 50 Asker C.

The mentioned sole parts form preferably a midsole.

The opening of the third mould for the purpose of demoulding the finished sole takes preferably place by moving two parts of the third mould away from each other.

The recesses in the finished sole preferably penetrate at least partially the sole completely in transverse direction. However, it can also be provided that the recesses only extend over part of the sole in the transverse direction.

The design of the sole achieved in this way makes it possible to influence the control of the spring and cushioning properties or the hardness of the sole in a simple way. By the design of the recesses it is possible to realize a desired spring deflection when the sole is loaded with the weight of the wearer of the shoe equipped with the sole.

Insofar, this concept is based on the use of so-called "Mechanical Meta Material", in which it is intended that various rows of openings (known here are round or oval recesses, especially in cross-section) of different sizes are or are to be inserted into the sole in order to achieve a certain spring or cushioning behaviour of the sole. This enables "Engineered Damping", in which the spring or damping properties obey a desired characteristic curve.

When a deformation force—caused by the weight of the wearer of the shoe—is applied, the resulting cells collapse in a special way so that special spring or damping character-istics can be realized.

In this respect, a "programmable folding or collapsing" of the sole structure is achieved, so to speak, since the structure itself forms a coherent system and the individual material sections are interdependent.

The advantages of the structure achieved by the proposed method can lead to a "negative stiffness", i.e. if the sole is slightly compressed in a vertical direction, the sole collapses in a defined way. It is also possible to structure the sole in the described way so that it has a sufficient degree of elasticity on the one hand and absorbs deformation energy due to a deformation force on the other.

The proposed method allows a process stable and precise production of the sole.

As explained above, the sole to be produced can consist of at least two, but also more sole parts.

The volume elements used are rod-shaped and have a constant cross-section along their longitudinal extension. This can ultimately have any shape. As shown in connection with the following embodiment, the cross-sectional shape of an "eight" is provided here, for example. The volume elements can be produced by means of an additive manu-facturing process (3-D printing) or in another way, for example by a classical machining process (milling). Stain-less steel in particular is a suitable material for the volume elements.

The volume elements can be arranged interchangeably in the first or second (and possibly also further) mould or mould part to produce soles with differently shaped cavities.

In some embodiments, an article of footwear includes a sole structure defining a forefoot region, a midfoot region, and a heel region along a longitudinal direction of the article of footwear. The sole structure includes a midsole, which has a plurality of cavities defined by outer edges, and each of the cavities of the plurality of cavities extends between a lateral side of the footwear and a medial side of the footwear. Each cavity of the plurality of cavities is defined by a first rounded end, a second rounded end opposite of the first rounded end, a front side edge, and a rear side edge, wherein the front side edge and the rear side edge connect the first rounded end with the second rounded end. The front side edge and the rear side edge taper inward from the first rounded end toward the second rounded end. Each cavity of the plurality of cavities is disposed along a line that extends in the same direction as the longitudinal direction and the plurality of cavities is configured to programmably collapse or deform the sole structure when a force is applied downward.

In some embodiments, a programmable sole structure includes a plurality of cavities extending along a longitudi-nal direction of the programmable sole structure. Each cavity of the plurality of cavities includes a first rounded end, a second rounded end opposite of first rounded end, and side edges connecting the first rounded end and the second rounded end. Each of the plurality of cavities includes a single major axis that bisects both the first rounded end and the second rounded end and a first major axis of a first cavity of the plurality of cavities is angularly offset from a second major axis of a second cavity of the plurality of cavities.

In some embodiments, an article of footwear includes a sole structure including a midsole. The midsole includes a plurality of cavities. The plurality of cavities is defined by a first rounded end and a second rounded end opposite the first rounded end. A first side edge and a second side edge opposite the first side edge, connects the first rounded end with the second rounded end. The plurality of cavities extends in a transverse direction over an entire width of the midsole and the plurality of cavities is configured to pro-grammably collapse or deform the midsole when a force is applied downward.

In the drawings an embodiment of the invention is shown.

Figure 2:
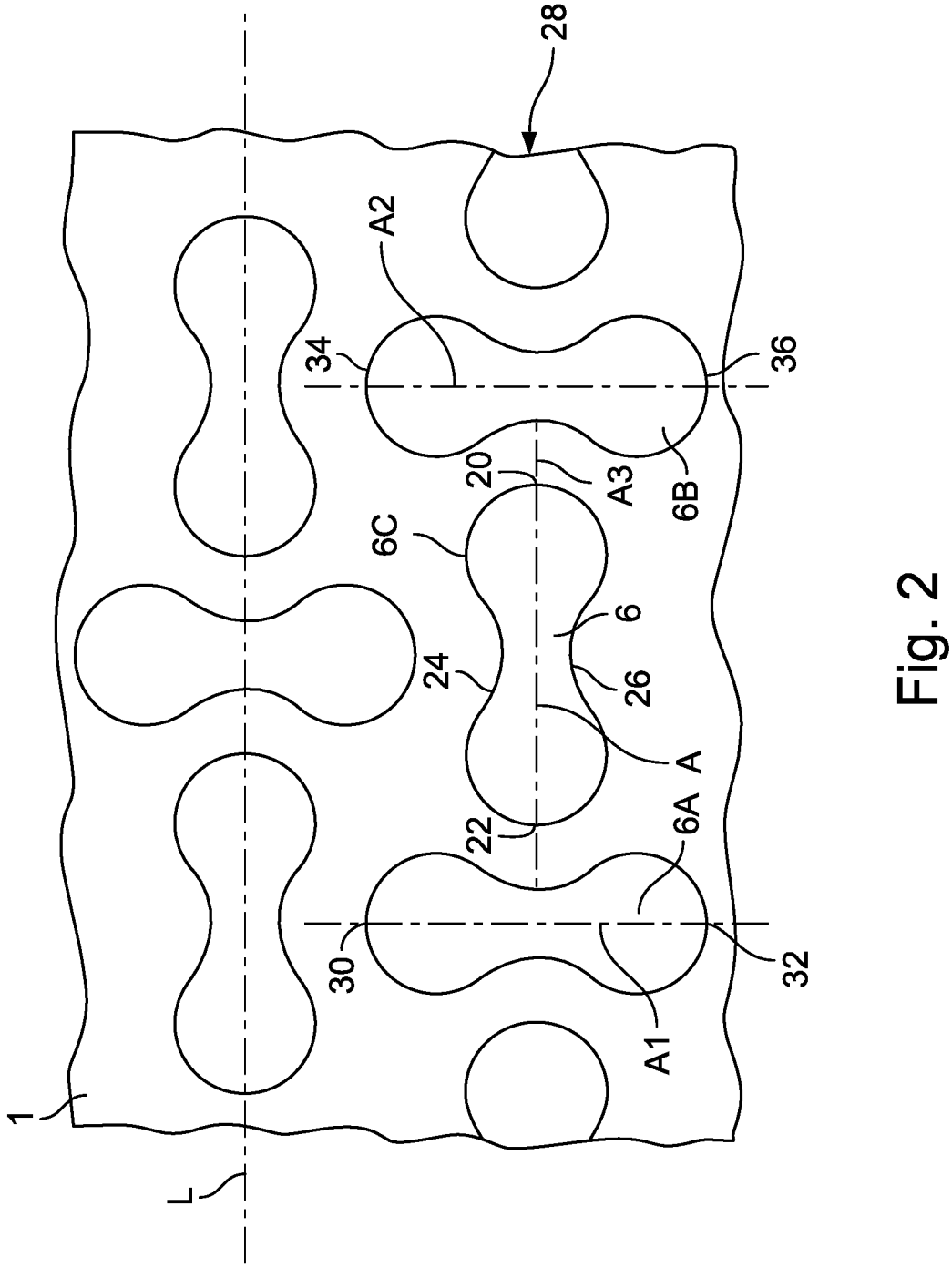
Figure 5:
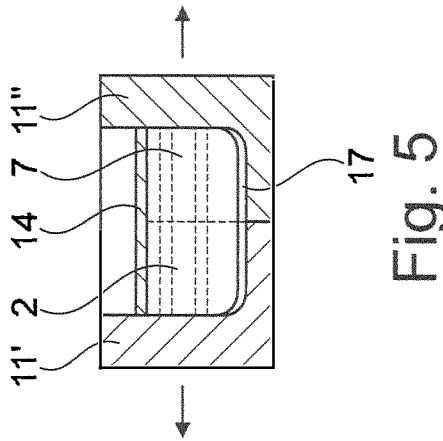
Figure 4:
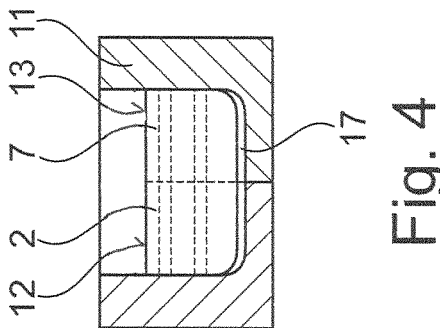
Figure 3:
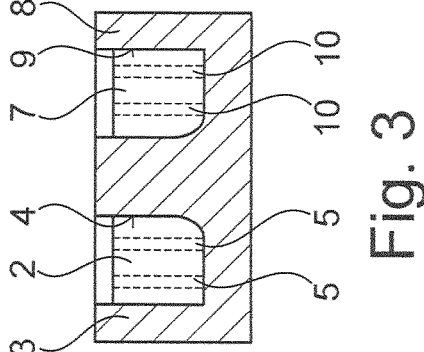
Figure 6:
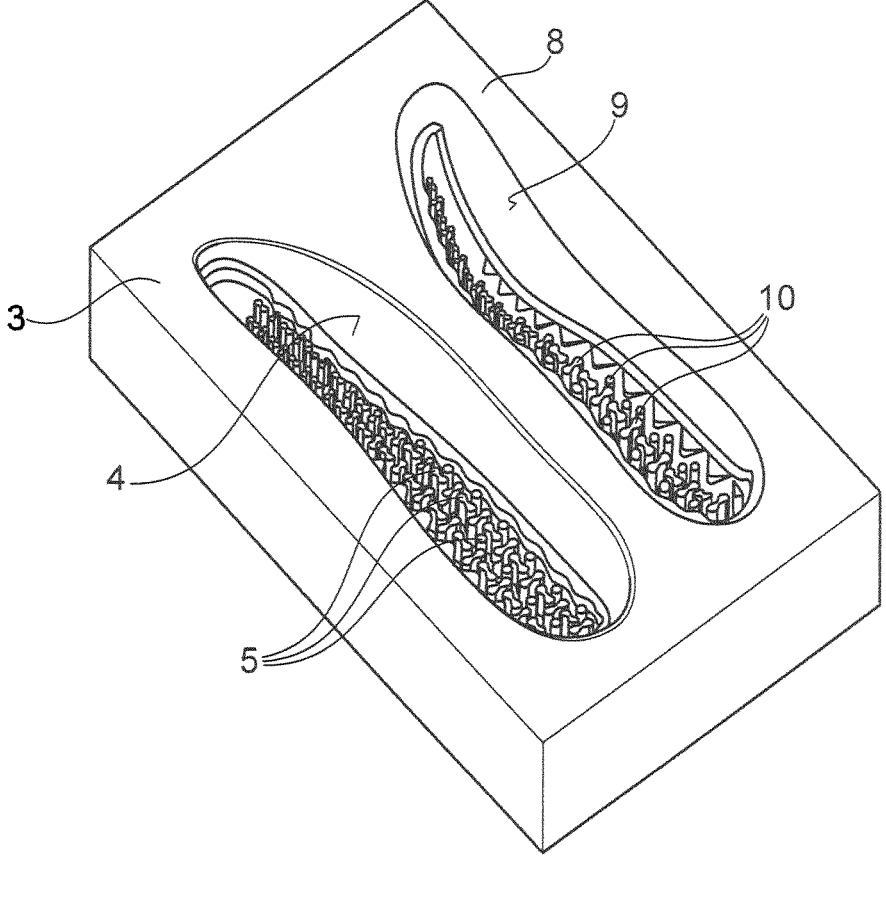
Figure 7:
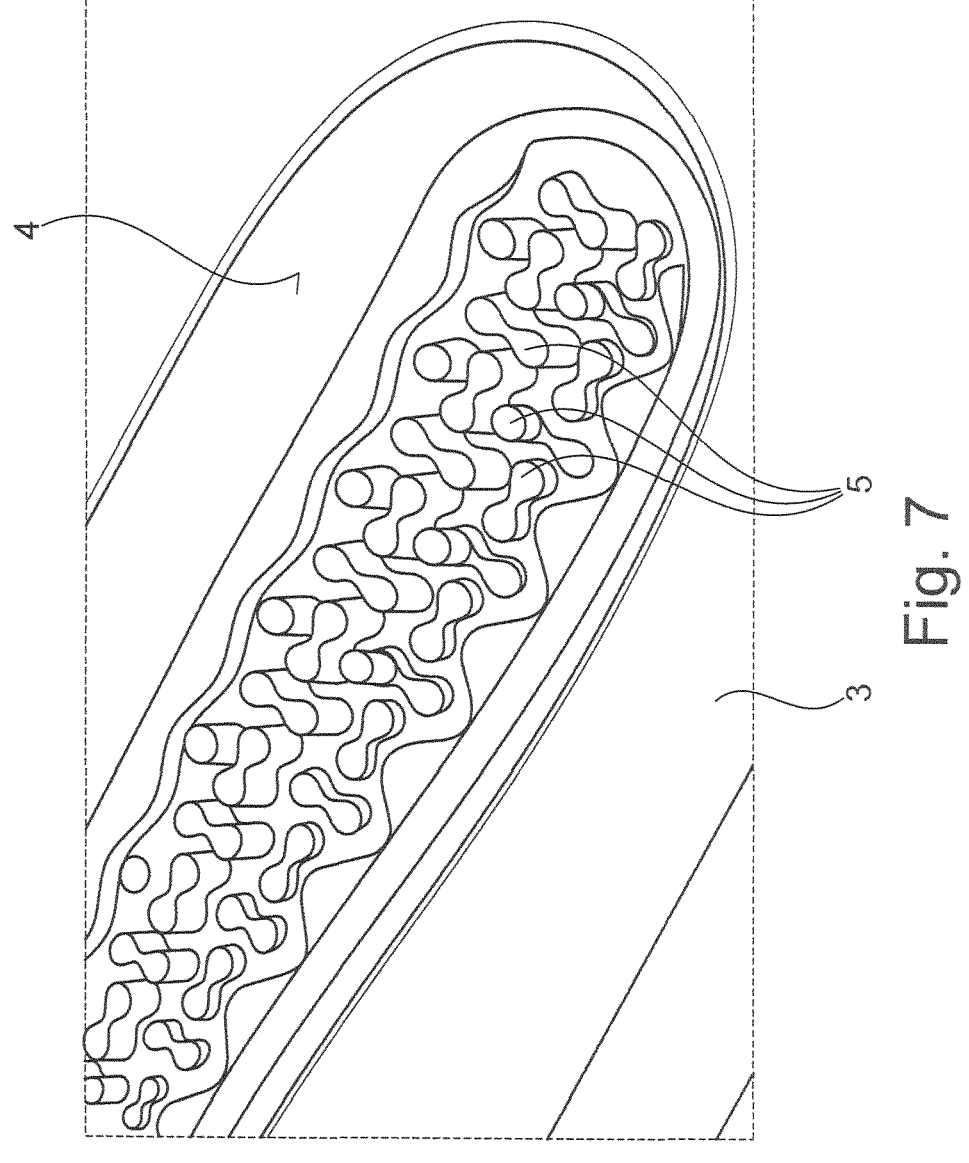
Figure 8:
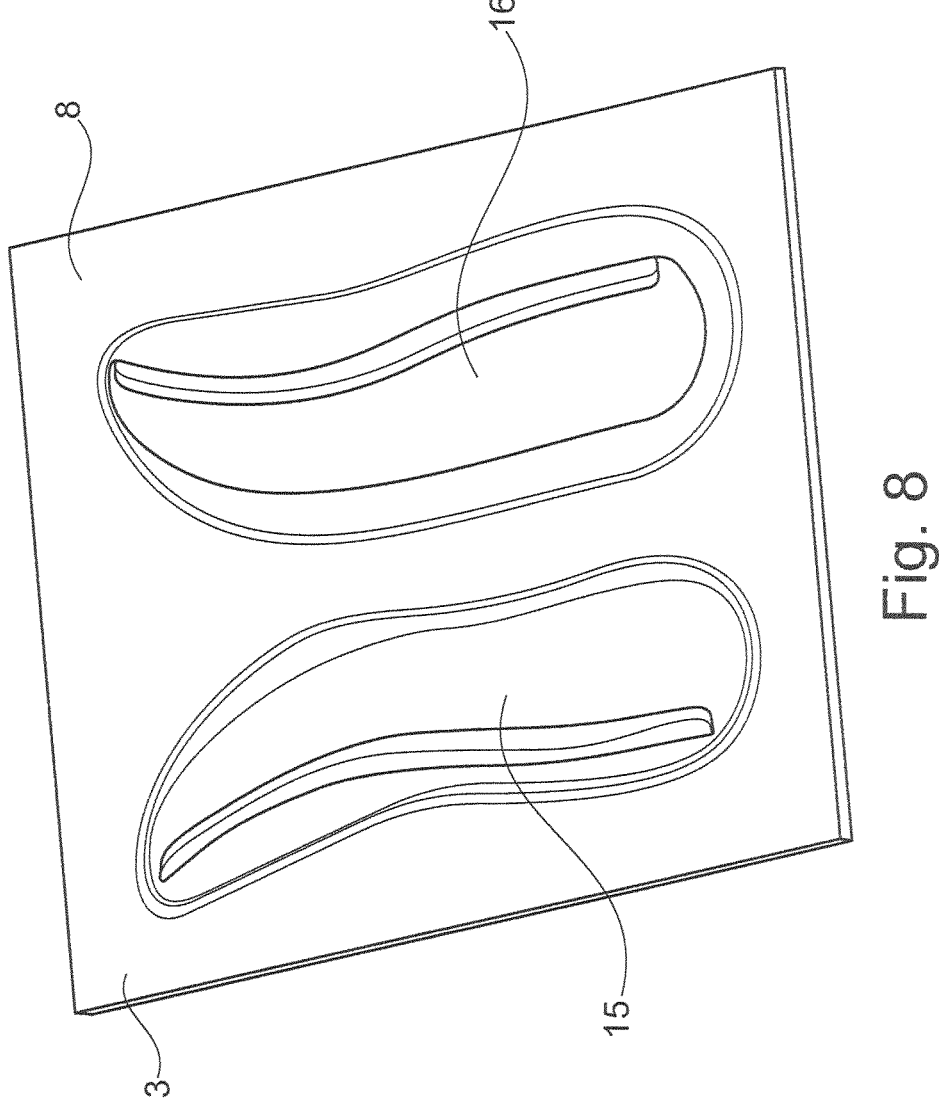
Figure 9:
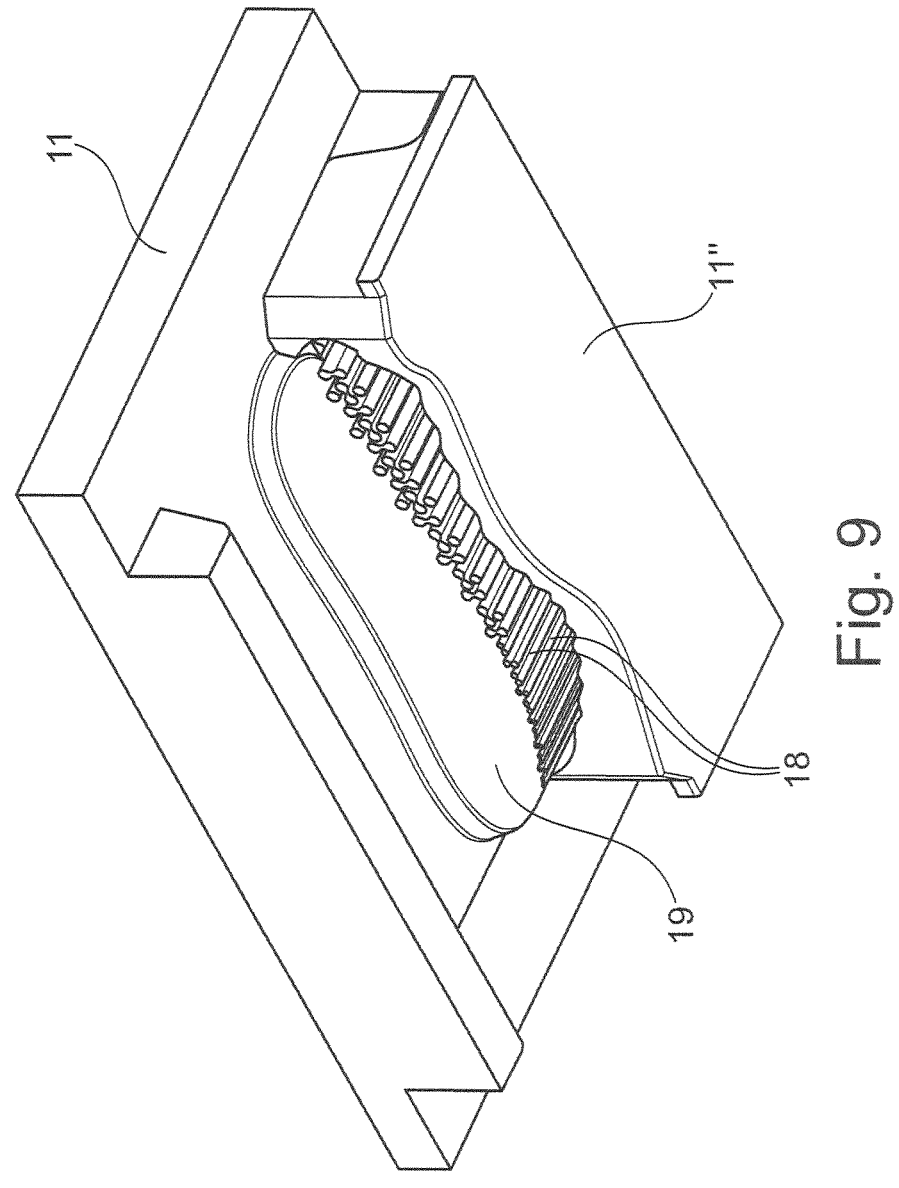
Figure 10:
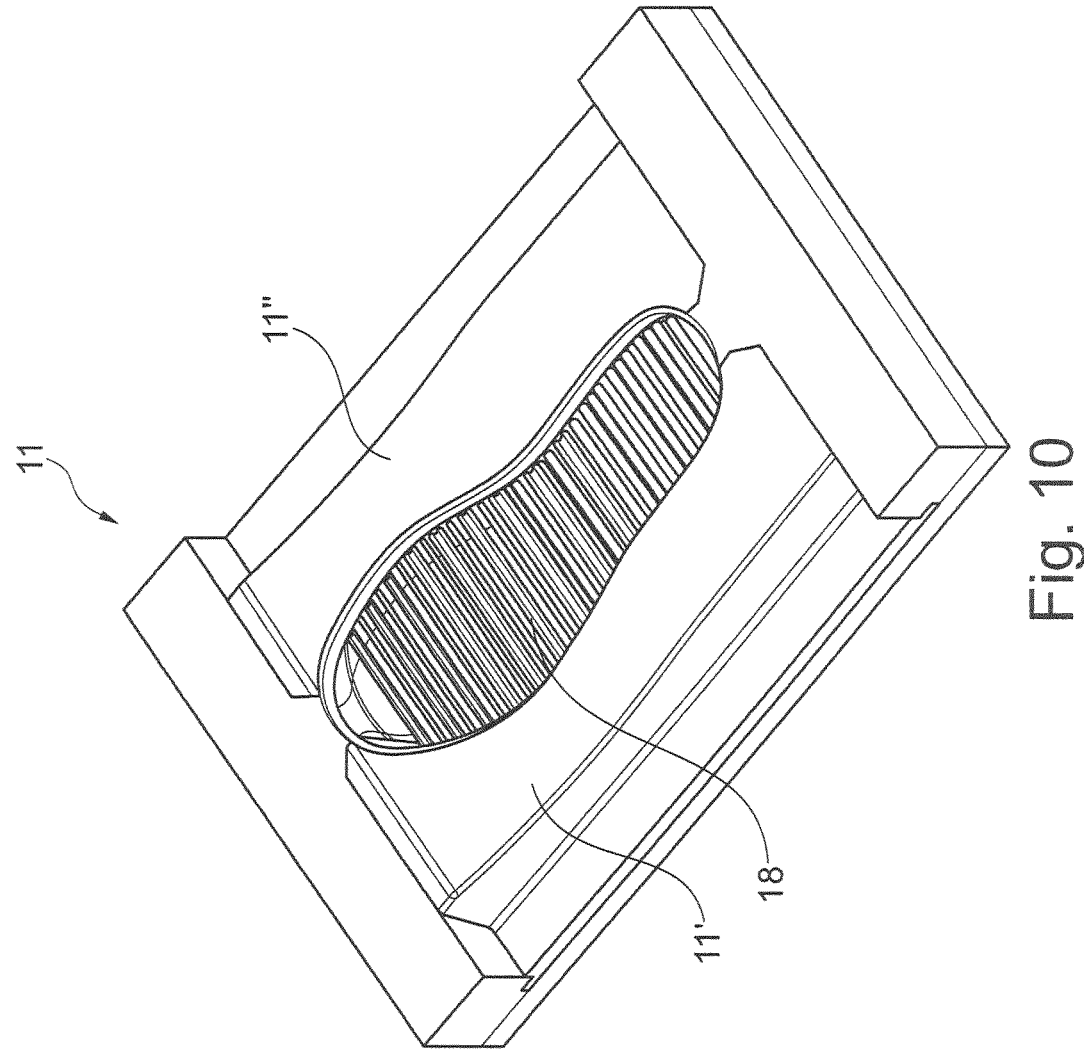

FIG. 1 shows a midsole of a sports shoe (still without upper applied connecting material), wherein this is produced according to the method according to the invention, FIG. 2 shows the section "X" according to FIG. 1 in more detail, seen in a transverse direction perpendicular to the longitudinal direction of the sole and perpendicular to the vertical direction, FIG. 3 shows schematically a first and a second mould part, in each of which one half of the midsole is produced, FIG. 4 shows schematically a third mould in which the two prefabricated halves of the midsole are inserted, whereby the connecting material connecting the two halves is still missing, FIG. 5 shows the third mould as shown in FIG. 4, where the connecting material connecting the two halves of the midsole has now been inserted, FIG. 6 shows in perspective view the first and second still empty mould part, FIG. 7 shows a section of FIG. 6 in enlarged view, FIG. 8 shows in perspective view, the first and second mould parts, with closure elements arranged in each case to delimit their cavities, FIG. 9 shows in perspective view the partially depicted third empty mould; and FIG. 10 shows in perspective view the third empty mould, where an upper closure part of the cavity is missing.

FIG. 1 shows a sole 1, which extends in a longitudinal direction L (corresponding to the longitudinal axis of the shoe with the sole) and in a vertical direction V (the vertical direction V indicates the direction when the shoe or the sole is standing on the ground when used as intended). Further-more, sole 1 extends in a transverse direction Q, which is perpendicular to both the longitudinal direction L and the vertical direction V.

Sole 1 is here designed as a midsole, to the upper side of which the (not shown) shoe upper is attached in known manner. An outer sole (not yet shown in FIG. 1) is attached to the bottom side of the sole.

Cavities 6 (recesses) are incorporated into the sole 1. Preferably, these recesses extend in transverse direction Q over the entire width of the sole 1. Details of the design and arrangement of the cavities 6 are shown in FIG. 2. FIG. 2 shows the detail "X" according to FIG. 1, namely the geometrical design of a possible embodiment of the cavities 6. Accordingly, the cavities 6 (or plurality of cavities) are defined by outer edges, and each of the cavities of the plurality of cavities extends between a lateral side and a medial side of the sole.

As can be seen in FIG. 2 in combination with FIG. 1, two rows of cavities 6 are inserted into the sole 1, each of which has the shape of an "eight" in the preferred embodiment shown here. This design enables the sole of the shoe to exhibit a special spring or cushioning behavior, whereby the sole collapses in a predetermined manner, i.e., programmably collapses, due to the recesses, especially when subjected to the weight of the wearer of the shoe, which provides a pleasant feeling of wear.

Still referring to FIG. 2, each of the cavities 6 includes a first rounded end 20 and a second rounded end 22 opposite the first rounded end 20. A front side edge 24 and a rear side edge 26 connect the first rounded end 20 with the second rounded end 22. Further, the front side edge 24 and the rear side edge 26 taper inward from the first rounded end 20 toward the second rounded end 22. The front side edge 24 and the rear side edge 26 taper inward from the first rounded end toward a major axis A of the cavity 6, which bisects the cavity 6 separating it into equal volumes. The cavities 6 extend along a line that extends in the same direction as the longitudinal axis L. A plurality of columns 28 of the cavities 6 are disposed along a longitudinal direction parallel to the longitudinal axis L. As shown in FIGS. 1 and 7, the cavities 6 may define a smaller cross-section in the forefoot region relative to the cavities 6 in the heel region.

The cavities 6 includes a first cavity 6A and a second cavity 6B. The first cavity 6A has a first top end 30 and a first bottom end 32 opposite the first top end 30. The first cavity 6A is symmetric about a first major axis A1 that extends between the first top end 30 and the first bottom end 32. The second cavity 6B includes a second top end 34 and a second bottom end 36 opposite the second top end 34. The second cavity 6B is symmetric about a second major axis A2 that extends between the second top end 34 and the second bottom end 36. The first major axis A1 and the second major axis A2 are angularly offset from each other and from an axis that is perpendicular with respect to the longitudinal axis L. In particular, the first major axis A1 of a first cavity 6A of the cavities 6 is angularly offset from the second major axis A2 of a second cavity 6B of the cavities 6. As illustrated in FIG. 2, the first and second cavities 6A, 6B are offset by 90 degrees relative to the longitudinal axis L. The cavities 6 includes a third cavity 6C that is disposed between the first cavity 6A and the second cavity 6B, and the third cavity 6C includes a third major axis A3. The third major axis A3 is angularly offset from the first major axis A1 and is parallel with respect to the longitudinal axis L.

As can be seen in FIG. 1, the sole 1 consists of two parts, namely a first part 2 and a second part 7, with sections 12 and 13 respectively on the upper side of each sole part 2 and 7, which are arranged adjacent to each other and form a largely flat surface (which essentially forms the later supporting surface for the wearer's foot). The two sole parts 2 and 7 are produced separately, each with the desired cavities 6, and then joined by applying bonding material to the sections 12 and 13, which holds the two sole parts 2, 7 together.

The provided process engineering method for this is illustrated in the following FIGS. 3 to 10.

FIG. 3 shows at first schematically a first method step, in which a first sole element 2 and a second sole element 7 are produced in a mould that has a first mould part 3 and a second mould part 8. The two mould parts 3 and 8 are here, which is not mandatory, arranged in a common tool body.

Each of the two sole parts 2 and 7 represents a half of the midsole of a shoe to be produced. In this respect, reference is made to FIG. 1, where the two parts are shown. To produce the two sole parts 2 and 7, liquid plastic material is injected, poured or sprayed into the first mould cavity 4 of the first mould part 3 and into the second mould cavity 9 of the second mould part 8. Volume elements 5 and 10, respectively, are arranged in the mould cavities 4, 9 and extend from the wall of the mould cavities 4, 9. If liquid plastic material is injected into the mould cavities 4, 9, the volume elements 5 and 10 respectively spare volumes which can be found as cavities 6 in the sole parts 2 and 7 to be produced (see the dotted lines in FIG. 3).

When the sole parts 2 and 7 thus produced have solidified, they are removed from the two mould parts 3 and 8 and inserted into a third mould 11 as shown in FIG. 4. The two sole parts 2 and 7 are aligned with each other in such a way that the cavities 6 are at least partially aligned with each other and extend over the entire width of the sole to be produced; this is again indicated by the dotted lines in FIG. 4.

Before the two sole parts 2 and 7 are placed in the third mould 11, a further sole element 17 in the form of an outer sole is inserted in the lower area. A suitable adhesive can be placed between this sole element and the two sole parts 2 and 7 to ensure a firm connection between sole parts 2 and 7 and the other sole part 17.

Now—as illustrated in FIG. 5—joining material 14 is injected, sprayed or poured onto sections 12 and 13, so that a layer of material is formed on the two sole parts 2 and 7, which holds the two sole parts 2 and 7 together.

The third mould 11 consists of two parts 11' and 11", which are moved away from each other in the direction of the two arrows in FIG. 5 after the joining material 14 has hardened, so that the sole, thus finished, can be removed from mould 11.

FIGS. 3 to 5 show a very schematic representation. In contrast, the other FIGS. 6 to 10 show a more concrete version of the moulds used.

FIG. 6 shows again the mould with the first and second mould parts 3 and 8, respectively, and the mould cavities 4 and 9. It can further be seen how the volume elements 5 and 10 extend out of the wall of the respective cavities. This can be seen again in FIG. 7 in an enlarged view. In particular, the design of the volume elements in the shape of an "eight" can be seen, in order to create correspondingly formed cavities 6 (see FIG. 2) in the sole.

FIG. 8 shows how, during production of the two sole parts 2 and 7, the two mould parts 3 and 8 are closed by respective closure parts 15 and 16 in order to give the sole parts 2 and 7 to be produced a defined geometry.

FIGS. 9 and 10 show the third mould 11 or parts of it.

FIG. 9 shows one part 11' of the third mould 11 and a closure part 19 which closes the mould cavity of the third mould 11 at the top. Volume elements 18, corresponding to those shown in FIGS. 6 and 7, can also be seen. These are volume elements that engage in the prefabricated cavities 6 of the two sole parts 2 and 7 and keep them free during processing in the third mould 11 so that they are not closed by the process steps taking place in the third mould 11. It is easy to demould the finished sole if the two parts 11' and 11" of the third mould 11 move away from each other in the manner shown in FIG. 5.

FIG. 10 shows the two parts 11' and 11" of the third mould 11 pushed together, whereby the two sole parts 2 and 7 are not yet included in the third mould 11. However, the volume elements 18 can be seen here again, which, when pushed together as shown in FIG. 10, form volumes that extend across the entire width of the sole to be produced and thus keep the cavities 6 in the sole parts 2, 7 free.

We claim:

1. An article of footwear, comprising:
a sole structure defining a forefoot region, a midfoot region, and a heel region along a longitudinal direction of the article of footwear, the sole structure including a midsole,
wherein the midsole includes a plurality of cavities defined by outer edges, and each of the cavities of the plurality of cavities extends between a lateral side of the footwear and a medial side of the footwear,
wherein each cavity of the plurality of cavities is defined by a first rounded end, a second rounded end opposite and spaced apart from the first rounded end in the longitudinal direction, a front side edge, and a rear side edge opposite the front side edge, wherein the front side edge and the rear side edge connect opposite ends of the first rounded end with the second rounded end,
wherein the front side edge and the rear side edge taper inward from the first rounded end toward the second rounded end,
wherein each cavity of the plurality of cavities is disposed along a line that extends in the same direction as the longitudinal direction, and
wherein the plurality of cavities is configured to collapse or deform the sole structure when a force is applied downward.

2. The article of footwear of claim 1, wherein forefoot cavities of the plurality of cavities define a smaller cross section in the forefoot region relative to heel cavities in the heel region.

3. The article of footwear of claim 1, wherein the plurality of cavities includes a first cavity and a second cavity,
wherein the first cavity includes a first top end and a first bottom end opposite the first top end, the first top end and the first bottom end being symmetrical about a first major axis,
wherein the second cavity includes a second top end and a second bottom end opposite the second top end, the second top end and the second bottom end being symmetrical about a second major axis, and
wherein the first major axis and the second major axis are angularly offset from each other and from an axis that is perpendicular with respect to the longitudinal direction.

4. The article of footwear of claim 3, wherein a third cavity is disposed between the first cavity and the second cavity, and
wherein the third cavity includes a third major axis.

5. The article of footwear of claim 4, wherein the third major axis is angularly offset from the first major axis and is parallel with respect to the longitudinal direction.

6. The article of footwear of claim 3, wherein the front side edge and the rear side edge of the first cavity taper inward from the first rounded end toward the first major axis.

7. The article of footwear of claim 3, wherein the front side edge and the rear side edge taper inward from the first rounded end toward the first major axis of the first cavity.

8. A sole structure, comprising:
a plurality of cavities disposed along a longitudinal direction of the sole structure,
wherein each cavity of the plurality of cavities includes a first rounded end, a second rounded end opposite and spaced apart from the first rounded end in the longitudinal direction, and side edges connecting opposite ends of the first rounded end and the second rounded end,
wherein each of the plurality of cavities includes a single major axis that extends between the first rounded end and the second rounded end,
wherein a front side edge and a rear side edge of each cavity of the plurality of cavities taper inward from the first rounded end toward the second rounded end, and
wherein a first major axis of a first cavity of the plurality of cavities is angularly offset from a second major axis of a second cavity of the plurality of cavities.

9. The sole structure of claim 8, wherein at least one cavity of the plurality of cavities is disposed along a line that extends in the same direction as the longitudinal direction, and
wherein the at least one cavity is a third cavity.

10. The sole structure of claim 8, wherein the major axis bisects each of the plurality of cavities separating the plurality of cavities into equal volumes.

11. The sole structure of claim 8, wherein the plurality of cavities extends between a lateral side and a medial side of the sole structure.

12. The sole structure of claim 8, wherein forefoot cavities of the plurality of cavities define a smaller cross section in a forefoot region relative to heel cavities in a heel region of the sole structure.

13. An article of footwear, comprising:
a sole structure including a midsole, the midsole including a plurality of cavities, each of the plurality of cavities defined by a first rounded end, a second rounded end opposite and spaced apart from the first rounded end in a longitudinal direction, a first side edge, and a second side edge opposite the first side edge,
wherein the first side edge and the second side edge connect opposite ends of the first rounded end with the second rounded end,
wherein each cavity of the plurality of cavities includes a single major axis between the first rounded end and the second rounded end,
wherein the first side edge and the second side edge taper inward from the first rounded end toward the second rounded end,
wherein the plurality of cavities includes a first row of cavities and a second row of cavities different than the first row of cavities, the first row of cavities and the second row of cavities each extending in a transverse direction over an entire width of the midsole, and
wherein the plurality of cavities is configured to collapse or deform the midsole when a force is applied downward.

14. The article of footwear of claim 13, wherein the major axis bisects the cavity between the first rounded end and the second rounded end.

15. The article of footwear of claim 14, wherein the plurality of cavities includes a first cavity having a first major axis, a second cavity having a second major axis, and a third cavity between the first and second cavity, having a third major axis, wherein the third major axis is angularly offset from the first major axis and the second major axis.

16. The article of footwear of claim 15, wherein the third major axis is parallel with respect to the longitudinal direction, and wherein the first major axis and the second major axis are perpendicular with respect to the longitudinal direction.

17. The article of footwear of claim 13, wherein forefoot cavities of the plurality of cavities define a smaller cross section in a forefoot region relative to heel cavities in a heel region.

18. The article of footwear of claim 14, wherein the first side edge and the second side edge taper inward from the first rounded end toward the major axis.

* * * * *